United States Patent
Engelhard

(10) Patent No.: US 9,752,325 B2
(45) Date of Patent: Sep. 5, 2017

(54) MULTI-LAYER FILM HAVING A HIGH PUNCTURE RESISTANCE AND RESISTANCE TO FURTHER TEARING

(75) Inventor: Heinz Engelhard, Nuremberg (DE)

(73) Assignee: Infiana Germany GmbH & Co. KG, Forchheim (DE)

( * ) Notice: Subject to any disclaimer, the term of this patent is extended or adjusted under 35 U.S.C. 154(b) by 162 days.

(21) Appl. No.: 13/491,662

(22) Filed: Jun. 8, 2012

(65) Prior Publication Data

US 2012/0240511 A1    Sep. 27, 2012

Related U.S. Application Data

(63) Continuation of application No. PCT/EP2010/007571, filed on Dec. 13, 2010.

(30) Foreign Application Priority Data

Dec. 11, 2009 (DE) ........................ 10 2009 057 862

(51) Int. Cl.
| | |
|---|---|
| *B32B 27/32* | (2006.01) |
| *B32B 27/34* | (2006.01) |
| *E04D 5/10* | (2006.01) |
| *B32B 11/04* | (2006.01) |
| *B32B 27/06* | (2006.01) |
| *B32B 27/08* | (2006.01) |
| *B32B 27/28* | (2006.01) |
| *C08L 23/10* | (2006.01) |
| *C08L 23/12* | (2006.01) |
| *C08L 23/14* | (2006.01) |
| *C08L 77/06* | (2006.01) |
| *C09J 7/02* | (2006.01) |

(52) U.S. Cl.
CPC ................ *E04D 5/10* (2013.01); *B32B 11/04* (2013.01); *B32B 27/06* (2013.01); *B32B 27/08* (2013.01); *B32B 27/28* (2013.01); *B32B 27/32* (2013.01); *B32B 27/34* (2013.01); *C08L 23/10* (2013.01); *C08L 23/12* (2013.01); *C08L 23/142* (2013.01); *C08L 77/06* (2013.01); *C09J 7/0296* (2013.01); *C09J 2201/162* (2013.01); *C09J 2423/006* (2013.01); *C09J 2477/006* (2013.01); *Y10T 428/2848* (2015.01); *Y10T 428/31757* (2015.04)

(58) Field of Classification Search
CPC ......... B32B 11/04; B32B 27/06; B32B 27/08; B32B 27/28; B32B 27/32; B32B 27/34; E04D 5/10; C08L 23/10; C08L 23/12; C08L 23/142; C08L 77/06; C08L 2666/06; C09J 7/0296; C09J 2201/162; C09J 2423/006; C09J 2477/006
See application file for complete search history.

(56) References Cited

U.S. PATENT DOCUMENTS

| | | | |
|---|---|---|---|
| 3,073,710 A | | 1/1963 | Morrow et al. |
| 3,937,640 A | * | 2/1976 | Tajima et al. ................... 156/71 |
| 4,950,720 A | | 8/1990 | Randall, Jr. et al. |
| 5,824,401 A | | 10/1998 | Jenkins et al. |
| 6,217,962 B1 | * | 4/2001 | Werth ..................... B32B 27/34 138/118 |
| 6,297,345 B1 | * | 10/2001 | Okushita et al. ............. 528/170 |
| 6,524,720 B1 | * | 2/2003 | Shah ...................... B32B 27/08 428/516 |
| 6,582,828 B1 | * | 6/2003 | Kaschel ..................... 428/476.9 |
| 2004/0109985 A1 | | 6/2004 | Furst |
| 2005/0058789 A1 | | 3/2005 | Nonaka et al. |
| 2005/0257875 A1 | * | 11/2005 | Khan et al. ..................... 156/60 |

FOREIGN PATENT DOCUMENTS

| | | | | |
|---|---|---|---|---|
| CA | 2 092 673 C | | 10/2002 | |
| CA | 2 467 923 A1 | | 5/2003 | |
| DE | 44 38 546 A1 | | 5/1996 | |
| DE | 196 50 383 A1 | | 6/1998 | |
| DE | 198 14 924 A1 | | 10/1999 | |
| DE | 10 2005 057 1 | | 6/2007 | |
| EP | 0 982 342 A1 | | 3/2000 | |
| EP | 1 407 878 A1 | | 4/2004 | |
| EP | 1 520 691 A1 | | 4/2005 | |
| GB | 2076741 A | * | 12/1981 | ............. B32B 27/08 |
| JP | 2-150406 A | | 6/1990 | |

(Continued)

OTHER PUBLICATIONS

Durethan® Product Range with Reference Data brochure from Lanxess. Oct. 18, 2010.*
Product Data Sheet: Isophorone Diisocyanate (IPDI) from Perstorp. Sep. 2008.*
English Translation of International Preliminary Report on Patentability along with Written Opinion of the International Search Autority. (five (5) pages).
International Search Report including English language translation dated Apr. 27, 2011(Seven (7) pages).
German Search Report including partial English language translation dated Oct. 1, 2010 (Five (5) pages).

*Primary Examiner* — Callie Shosho
*Assistant Examiner* — John Freeman
(74) *Attorney, Agent, or Firm* — Crowell & Moring LLP

(57) ABSTRACT

A multi-layer film comprising a layer (a) and a layer (c), each layer comprising at least one propylene copolymer in a quantity of at least 30% by weight and at least one propylene homopolymer in a quantity of at least 20% by weight, in each case relative to the total quantity of the layer (a) or (c), at least one inner layer (b) based on at least one homo- and/or co-polyamide having isophorondiamine units as polyamide components, and further comprising adhesion promoter layers (d) and (e) arranged between the layers (a) and (b) and between the layers (b) and (c), respectively, each adhesion promoting layer being based on at least one modified thermoplastic olefin homopolymer or olefin copolymer; a sealing sheet comprising such a multi-layer film, and the use of such a multi-layer film for covering roofs.

12 Claims, No Drawings

(56) References Cited

FOREIGN PATENT DOCUMENTS

| | | | |
|---|---|---|---|
| JP | 7-148897 A | 6/1995 |
| JP | 8-207197 A | 8/1996 |
| JP | 10-128926 A | 5/1998 |
| JP | 11-165389 A | 6/1999 |
| JP | 11-286544 A | 10/1999 |
| JP | 2005-88344 A | 4/2005 |
| WO | WO 02/085619 A1 | 10/2002 |
| WO | WO 2008/022324 A2 | 2/2008 |

* cited by examiner

MULTI-LAYER FILM HAVING A HIGH PUNCTURE RESISTANCE AND RESISTANCE TO FURTHER TEARING

CROSS REFERENCE TO RELATED APPLICATIONS

This application is a continuation of international patent application no. PCT/EP2010/007571, filed Dec. 13, 2010, designating the United States of America, and published in German on Jun. 16, 2011 as WO 2011/069680 A1, the entire disclosure of which is incorporated herein by reference. Priority is claimed based on Federal Republic of Germany patent application no. DE 10 2009 057 862.5, filed Dec. 11, 2009, the entire disclosure of which is likewise incorporated herein by reference.

BACKGROUND OF THE INVENTION

The present invention relates to a multilayer film comprising a layer (a) and a layer (c) based in each case on an amount of at least 30% by weight of at least one propylene copolymer and on an amount of at least 20% by weight of at least one propylene homopolymer, and optionally on a further polyolefin, preferably polyethylene, and optionally up to 30% by weight of additives, based in each case on the total weight of the layer (a) respectively (c), where said components always give a total of 100% by weight, at least one internal layer (b) based on at least one homo- and/or polyamide having isophoronediamine units as polyamide component, and, in each case, arranged between the layers (a) and (b), respectively (b) and (c) an adhesion-promoter layer (d) respectively (e) in each case based on at least one modified thermoplastic olefin homo- or copolymer, to a sealing sheet comprising a multilayer film of this type, and also to the use thereof for covering roofs.

The prior art discloses a wide variety of multilayer films which are suitable for a wide variety of technical applications. However, a requirement for some of these technical applications is that the multilayer films used for these purposes feature a combination of quite particular mechanical properties, and also specific barrier properties. This particularly applies to multilayer films which are used for producing sealing sheets, in particular bitumen-based sealing sheets. Bitumen-based sealing sheets of this type are used by way of example for covering roofs.

The prior art has already disclosed sealing sheets of this type comprising multilayer films. However, a disadvantage of said sealing sheets produced of multilayer films is that these often lack adequate barrier properties with respect to oils, in particular mineral oils. Oils of this type are in particular components of bitumen-based compositions. Migration of said oils from the bitumen-based composition into the multilayer film causes not only drying-out of the bituminous composition but also a reduction in the adhesion of the multilayer film on the bitumen-based sheets resulting in a separation thereof from the bitumen-based composition over the course of time.

The multilayer films disclosed in the prior art and used for producing sealing sheets moreover often have unsuitable mechanical properties, for example inadequate tensile strength, poor tear-propagation properties, and insufficient puncture resistance. Specifically, multilayer films for sealing sheets, e.g. for covering roofs, have to comply with stringent mechanical requirements because they have exposure to high mechanical loads resulting from personnel walking thereon, and from storage and movement of construction material, and also from effects of weathering.

There is therefore a need for multilayer films which exhibits not only very good barrier properties with respect to oils but also very good mechanical stability.

SUMMARY OF THE INVENTION

It was therefore an object of the present invention to provide multilayer films which feature very good barrier action with respect to oils, and improved mechanical properties, such as improved tear propagation resistance and puncture resistance, and good tensile strength, in comparison with known multilayer films. This and other objects of the invention have bee achieved by providing a multilayer film comprising at least (a) one layer, preferably in the form of a surface layer, based on an amount of at least 30% by weight, based on the total weight of the layer (a), of at least one propylene copolymer, on an amount of at least 20% by weight of at least one propylene homopolymer, and optionally on a further polyolefin, preferably a polyethylene, and optionally up to 30% by weight of additives, based on the total weight of the layer (a), whereby the components always give a total of 100% by weight, (b) at least one internal, preferably central, layer based on at least one homo- and/or copolyamide having isophoronediamine units as polyamide component, (c) a layer, preferably in the form of a second surface layer, based on an amount of at least 30% by weight, based on the total weight of the layer (c), of at least one propylene copolymer, on an amount of at least 20% by weight, based on the total weight of the layer (c), of at least one propylene homopolymer, and optionally on a further polyolefin, preferably a polyethylene, and optionally up to 30% by weight of additives, based on the total weight of the layer (c), whereby the components always give a total of 100% by weight, and (d) respectively (e) as adhesion-promoter layers (d) respectively (e) in each case arranged between the layer (a) and the layer (b) respectively between the layer (b) and the layer (c) in each case based on at least one modified thermoplastic olefin homo- or copolymer.

DETAILED DESCRIPTION OF PREFERRED EMBODIMENTS

It is preferable that the layers (a) respectively (c) are surface layers of the multilayer film of the invention.

The layer (a), which may be identical with or different from the layer (c) of the multilayer film of the invention, comprises an amount of at least 30% by weight, preferably of at least 35% by weight, particularly preferably of at least 40% by weight, based in each case on the total weight of the layer (a) respectively (c), of at least one propylene copolymer.

A preferably suitable propylene copolymer of the layer (a) respectively (c) of the multilayer film of the invention is at least one copolymer of propylene and of an α,β-unsaturated olefin preferably having 2, or from 4 to 6, carbon atoms. It is particularly preferable that the layer (a) respectively (c) comprises at least one propylene copolymer selected from the group consisting of propylene-ethylene copolymers, propylene-butylene copolymers, propylene-isobutylene copolymers, and mixtures of at least two of the copolymers mentioned. It is very particularly preferable that at least one propylene-ethylene copolymer is present in the layer (a) or (c).

It is particularly preferable that the layer (a) respectively (c) comprises at least one propylene-ethylene copolymer which has, based on the total weight of the propylene-ethylene copolymer, at most 10% by weight, preferably from 1 to 10% by weight, particularly preferably from 5 to 10% by weight, very particularly preferably from 7 to 9% by weight, of ethylene units.

The layer (a) respectively (c) of the multilayer film of the invention in each case comprises an amount of at least 20% by weight, preferably of at least 25% by weight, based on the total weight of the layer (a) respectively (c), of at least one propylene homopolymer.

The layer (c) is preferably the second surface layer of the multilayer film of the invention.

Preferably the layer (a), respectively the layer (c) of the multilayer film of the invention, respectively mutually independently, have a layer thickness of from 5 µm to 100 µm, particularly preferably from 10 µm to 90 µm, very particularly preferably from 20 µm to 80 µm, in particular from 25 µm to 70 µm, and with particular preference from 30 82 m to 50 µm.

In one preferred embodiment of the multilayer film of the invention, the layer (a) and the layer (c) have an identical layer structure, and preferably an identical layer thickness, and identical polymer components.

The layer (b) of the multilayer film of the invention is an internal layer which is preferably central in relation to the structure of the multilayer film and which is based on at least one homo- and/or copolyamide having isophoronediamine units.

The layer (b) of the multilayer film of the invention preferably serves as a barrier layer, particularly preferably as a gas-barrier layer, with preference as an oxygen-barrier layer, a water-vapor-barrier layer, and/or an oil-barrier layer, and with very particular preference as an oil-barrier layer.

Homo- and/or copolyamides suitable for producing the layer (b) and having isophoronediamine units as diamine units are preferably at least one homo- or copolyamide selected from the group consisting of thermoplastic, aliphatic, semiaromatic, and aromatic homo- or copolyamides having isophoronediamine units. These copolyamides having isophoronediamine units can be composed of further aliphatic and/or cycloaliphatic diamines having from 2 to 10 carbon atoms, such as hexamethylenediamine, and/or of aromatic diamines having from 6 to 10 carbon atoms, such as p-phenylenediamine, and of aliphatic and/or aromatic dicarboxylic acids having from 6 to 14 carbon atoms, e.g. adipic acid, terephthalic acid, or isophthalic acid. The copolyamides having isophoronediamine units can moreover also be produced from lactams having from 4 to 10 carbon atoms, e.g. from ε-caprolactam. However, in every case isophoronediamine is used as at least one diamine component for producing said homo- and/or copolyamides, and the homo- and/or copolyamides suitable for producing the layer (b) therefore comprise isophoronediamine units. Polyamides having isophoronediamine units and used in the invention are preferably copolyamides formed from ε-caprolactam, from isophoronediamine, and from an aromatic dicarboxylic acid, preferably isophthalic acid.

It is preferable that the layer (b) is based on at least one homo- and/or copolyamide having isophoronediamine units, particularly preferably on at least one copolyamide having an amount of at least 30% by weight, based on the total weight of the layer (b), particularly preferably at least 35% by weight, and very particularly preferably at least 40% by weight, of isophoronediamine units.

It is preferable that the proportion of isophoronediamine units in the abovementioned polyamide component of the layer (b) is at least 1% by weight, based on the total weight of said polyamide component, particularly preferably at least 2% by weight, very particularly preferably at least 3% by weight, in particular at least 4% by weight, with particular preference at least 5% by weight.

In another preferred embodiment, the proportion of isophoronediamine units in the abovementioned polyamide component of the layer (b) is preferably at least 1 to 10% by weight, based on the total weight of the polyamide component, particularly preferably from 1.2 to 9% by weight, very particularly preferably from 1.5 to 8% by weight, in particular from 1.8 to 7% by weight, with particular preference from 2 to 6% by weight.

In one preferred embodiment, the polyamide component of the layer (b), comprising isophoronediamine units, comprises aliphatic or aromatic dicarboxylic acid units, preferably aromatic dicarboxylic acid units, particularly preferably aromatic dicarboxylic acid units selected from the group consisting of terephthalic acid units and isophthalic acid units.

It is preferable that the layer (b) comprises, as further polyamide component, at least one, preferably aliphatic, homo- and/or copolyamide comprising no isophoronediamine units, where the amount of this polyamide is at least 40% by weight, based on the total weight of the layer (b), particularly preferably at least 45% by weight, very particularly preferably at least 50% by weight, in particular at least 60% by weight, where the polyamide components always give a total of 100% by weight.

Homo- and/or copolyamides which comprise no isophoronediamine units and which are suitable as further polyamide component for producing the layer (b) are preferably those selected from the group consisting of thermoplastic aliphatic, semiaromatic, and aromatic homo- or copolyamides. These homo- or copolyamides which comprise no isophoronediamine units can be composed of aliphatic and/or cycloaliphatic diamines having from 2 to 10 carbon atoms, such as hexa-methylenediamine, and/or of aromatic diamines having from 6 to 10 carbon atoms, such as p-phenylenediamine, and of aliphatic and/or aromatic dicarboxylic acids having from 6 to 14 carbon atoms, e.g. adipic acid, terephthalic acid, or isophthalic acid. These homo- or copolyamides can moreover be produced from lactams having from 4 to 10 carbon atoms, e.g. from ε-caprolactam. Homo- and/or copolyamides which are used in the invention and which comprise no isophoronediamine units are preferably those selected from the group consisting of PA 6, PA 12, PA 66, PA 6I, PA 6T, corresponding copolymers, and mixtures of at least two of the polyamides mentioned.

The layer (b) of the multilayer film of the invention preferably has a layer thickness of from 5 µm to 100 µm, particularly preferably from 7.5 µm to 75 µm, very particularly preferably from 10 µm to 50 µm, in particular from 15 µm to 30 µm.

The adhesion-promoter layers (d) and (e) of the multilayer film of the invention are respectively based on at least one modified thermoplastic olefin homo- or copolymer.

Materials preferably suitable for producing the adhesion-promoter layers (d) and (e) are modified thermoplastic olefin homo- or copolymers of α,β-unsaturated olefins having from 2 to 10 carbon atoms, e.g. polyethylene (PE, in particular LDPE or HDPE), polypropylene (PP), polybutylene (PB), polyisobutylene (PI), or a mixture of at least two of the polymers mentioned. "LDPE" denotes low-density polyethylene, the density of which is in the range from 0.86 to 0.93 g/cm³, and which features a high degree of branching of the molecules. "HDPE" denotes high-density polyethylene, which has only slight branching of the molecular chain, where the density can be in the range from 0.94 to 0.97 g/cm³. A preferred thermoplastic modified olefin homo- or copolymer for producing the adhesion-promoter layers (d) and (e) is modified propylene homopolymer. The thermoplastic olefin homo- or copolymers have preferably been modified with polymer groups, preferably with organic acid groups (carboxy groups), and/or with organic anhydride groups, particularly preferably maleic anhydride groups.

It is preferable that the adhesion-promoter layers (d) and (e) are respectively based on at least one modified propylene homopolymer, where the amount of said polymer is respectively at least 45% by weight, based in each case on the total weight of the adhesion-promoter layers (d) and, respectively, (e), particularly preferably at least 55% by weight, very particularly preferably at least 65% by weight, very particularly preferably at least 75% by weight.

In one preferred embodiment of the multilayer film of the invention, the adhesion-promoter layers (d) and/or (e) comprise, as further polyolefin component, respectively mutually independently at least one unmodified olefin homo- or copolymer, preferably respectively mutually independently at least one unmodified olefin homopolymer, particularly preferably respectively an unmodified propylene homopolymer, preferably respectively in a proportion of up to 30% by weight, based in each case on the total weight of the adhesion-promoter layers (d) and, respectively, (e), where the polyolefin components always give a total of 100% by weight.

In one preferred embodiment, the adhesion-promoter layers (d) and/or (e) comprise, as further polyolefin component, respectively mutually independently an amount of from 5 to 30% by weight, preferably from 15 to 30% by weight, of at least one unmodified olefin homo- or copolymer, where the polyolefin components always give a total of 100% by weight.

In another preferred embodiment of the multilayer film of the invention, the adhesion-promoter layers (d) and/or (e) comprise, as further polymer component, respectively mutually independently at least one copolymer of an olefin and of at least one further α,β-unsaturated monomer having at least one ester group, particularly preferably respectively mutually independently at least one copolymer of ethylene or propylene and of at least one compound selected from the group consisting of vinyl acetate and alkyl (meth)acrylate, preferably methyl (meth)acrylate, ethyl (meth)acrylate, n- and isopropyl (meth)acrylate, n- and isobutyl (meth)acrylate, tert-butyl (meth)acrylate, 2-ethylhexyl (meth)acrylate, cyclohexyl (meth)acrylate, and isobornyl (meth)acrylate, preferably in an amount of from 0.1 to 30% by weight, particularly preferably from 1 to 20% by weight, very particularly preferably from 2 to 10% by weight, based in each case on the total weight of the adhesion-promoter layers (d) respectively (e), whereby the polymer components always give a total of 100% by weight.

A material preferably present as further polymer component of the adhesion-promoter layers (d) and/or (e) is at least one copolymer selected from the group consisting of ethylene-vinyl acetate copolymers and ethylene-$C_{1-4}$-alkyl (meth)acrylate copolymers, preferably an ethylene-vinyl acetate copolymer and/or an ethylene-butyl acrylate copolymer.

The adhesion-promoter layers (d) and (e) of the multilayer film of the invention preferably have respectively mutually independently a layer thickness of from 1 μm to 30 μm, particularly preferably from 2 μm to 25 μm, very particularly preferably from 3 μm to 20 μm, in particular from 4 μm to 15 μm.

In one preferred embodiment of the multilayer film of the invention, the adhesion-promoter layers (d) and (e) have an identical layer structure, and preferably an identical layer thickness, and identical polymer components.

In one preferred embodiment, the arrangement of the multilayer film of the invention is symmetrical in relation to a central layer (b).

The layer (a), the layers (b) and (c), and also the adhesion-promoter layers (d) and (e) can if necessary respectively mutually independently comprise additives selected from the group consisting of antioxidants, antiblocking agents, antifogging agents, antistatic agents, antimicrobial ingredients, UV absorbers, UV filters, dyes, color pigments, light stabilizers or other stabilizers, preferably heat stabilizers, process stabilizers, and UV stabilizers and/or light stabilizers, preferably based on at least one sterically hindered amine (HALS), processing aids, flame retardants, nucleating agents, crystallization agents, preferably crystal-nucleating agents, lubricants, optical brighteners, flexibilizers, sealing agents, plasticizers, silanes, spacers, fillers, peel additives, waxes, wetting agents, surface-active compounds, preferably surfactants, and dispersing agents.

The layer (a), the layers (b) and (c), and also the adhesion-promoter layers (d) and (e) can respectively mutually independently comprise at least 0.01 to 30% by weight, preferably at least 0.1 to 20% by weight, based in each case on the total weight of the individual layer, of at least one of the abovementioned additives. To this end, the additives can be incorporated in the form of masterbatches in polyolefins, such as polyethylene, or in polyamides, into the respective layer.

The multilayer film of the invention preferably has a total layer thickness of from 10 μm to 300 μm, particularly preferably from 15 μm to 250 μm, very particularly preferably from 20 μm to 200 μm, in particular from 30 μm to 180 μm, with particular preference from 50 μm to 150 μm.

It is preferable that the puncture resistance of the multilayer film of the invention is at least 250 N in accordance with ASTM E154-10, its tensile strength is at least 150 N in accordance with ASTM D1970, and/or its tear-propagation resistance is at least 1500 mN by the Elmendorf method (ISO 6383-2).

In one preferred embodiment, the multilayer film of the invention comprises at least one preferably permanently adhesive layer (f), particularly preferably a pressure-sensitive adhesive layer, and/or has at least one layer (h) based on a sealing composition, preferably on a self-adhesive sealing composition, particularly preferably on a self-adhesive bitumen-based sealing composition or on a self-adhesive sealing composition based on rubber, preferably butyl rubber, in particular on a low-temperature-self-adhesive or high-temperature-self-adhesive bitumen-based sealing composition, with particular preference on a low-temperature-self-adhesive bitumen-based sealing composition, optionally respectively on one of its surface layers. If the multilayer film of the invention comprises at least one layer (h) and/or at least one adhesive layer (f), this layer can optionally have on its surface a removable protective film or a removable protective layer (g), preferably based on siliconized paper.

The present invention further relates to a process for producing the multilayer film of the invention.

In one preferred embodiment, the layers (a), (b), (c), (d), and (e) of the multilayer film of the invention can be produced and processed in the form of entire multilayer film in the form of a tubular film.

In another preferred embodiment, layers (a), (b), (c), (d), and (e) of the multilayer film of the invention can be produced and processed in their entirety in the form of a cast film.

Accordingly, the individual layers (a), (b), (c), (d), and (e) of the multilayer film of the invention can be produced by coextrusion.

The multilayer film of the invention made of the layers (a), (b), (c), (d), and (e) is preferably obtainable by (co)extrusion, particularly preferably by blown-film (co)extrusion, or by cast (co)extrusion.

If the multilayer film of the invention comprises a preferably adhesive layer (f) of permanently adhesive, preferably a layer (f) of pressure-sensitive adhesive, on one of its surface layers, then said adhesive layer (f) can be produced by coating or lamination of one of the surfaces of the layer composite of the layers (a), (b), (c), (d), and (e) of the multilayer film of the invention with the layer (f) of adhesive. For protection of the adhesive layer (f), its surface can optionally be provided with a removable protective film or with a removable protective layer (g) as protective covering, in a subsequent process step.

If the multilayer film of the invention comprises a layer (h) based on a sealing composition on one of its surface layers which is not permanently adhesive, then said layer (h) can be bonded to one of the surfaces of the layer composite of the layers (a), (b), (c), (d), (e) and optionally (f) of the multilayer film of the invention by coating or lamination with a conventional lamination adhesive. If the layer (h) is based on a self-adhesive sealing composition, the multilayer film of the invention can be bonded via simple coating to the layer (h), optionally with cooling or heating of the sealing composition. For protection of the layer (h), its surface can optionally be provided with a removable protective film or with a removable protective layer (g) as protective covering, in a subsequent process step.

The respective production processes and corresponding production parameters are well-known to persons skilled in the art.

The multilayer film of the invention can preferably be a printed and/or colored film.

The multilayer film of the invention with adhesive layer is preferably used as adhesive tape.

The present invention therefore further provides the use of the multilayer film of the invention for producing an adhesive tape, and the use of the multilayer film of the invention in the form of an adhesive tape.

The present invention further provides an adhesive tape comprising a multilayer film of the invention.

The multilayer film of the invention with sealing composition is also preferably used as sealing sheet.

The present invention therefore also provides the use of the multilayer film of the invention for producing a sealing sheet, preferably a bitumen-based sealing sheet, and the use of the multilayer film of the invention in the form of a sealing sheet, preferably bitumen-based sealing sheet, for covering roofs, for pipe cladding, for external cladding, or for the protective covering of buildings or of parts of buildings. The present invention further provides a sealing sheet, preferably a bitumen-based sealing sheet, comprising a multilayer film of the invention, and preferably effective against water and/or influences of weathering. The present invention further provides a sealing sheet comprising a multilayer film of the invention, preferably a bitumen-based sealing sheet, for covering roofs, as external cladding, as protective covering for buildings or for parts of buildings, or as pipe cladding, preferably as protective covering sleeve.

Determination of Barrier Effect Against Oil

The gravimetric test method described below for determining the barrier effect of a multilayer film against oil can be used to determine whether, even after prolonged storage, a multilayer film suppresses the migration of oil from an oil-containing composition, e.g. from bitumen, i.e. does not absorb the oils present in the bitumen but instead exhibits a barrier effect against the oils present therein.

A bitumen-based composition protectively covered by a silicone release liner is applied (19 cm×19 cm) to a first, lower substrate film (OPET film, smooth, DIN A4) with very good barrier effect against oils. After removal of the silicone release liner from the bitumen-based composition, a sample of the multilayer film (DIN A4) of the invention (or of a comparative film) is applied centrally to the same, while avoiding any air inclusions, in such a way as to cover the entire bitumen area. The sample of the multilayer film of the invention is pressed onto the bitumen area by means of a wallpaper roller. An absorptive liner, i.e. a film without barrier effect against oils (LDPE film, smooth, DIN A4), is applied to the multilayer film which has been applied to the bitumen area, and in turn a second, upper surface film (OPET film, smooth, DIN A4) is applied to said absorptive liner. Four weights, each of 2.6 kg, are placed on said second capping film, and the entire test package in this form is stored for a period of one week at 40° C. in an oven.

The barrier effect against oil is determined by means of quantitative determination of oil absorption into the sample of the multilayer film of the invention and, respectively, into the absorptive liner. For this purpose, both the sample and the absorptive liner are weighed by the analysis balance before the test begins. The test package is taken out of the oven after each of 3, 5, and 7 days, and the individual and, respectively, into the absorptive liner. For this purpose, both the sample and the absorptive liner are weighed by the analysis balance before the test begins. The test package is taken out of the oven after each of 3, 5, and 7 days, and the individual plies are separated from one another, and both the sample and the absorptive liner are weighed on the analysis balance. In order to avoid misinterpretation, care has to be taken to avoid adhesion of any bitumen residues on the sample. After the weighing procedure, the individual plies are returned to their original position. It is thus possible to calculate the weight increase in %, starting from the initial weights. The changes in weight can thus be used to conclude about the extent of oil absorption and, with this, the barrier properties against oils.

Determination of Tear-Propagation Resistance

Tear-propagation resistance is determined in accordance with ISO 6383-2 and measured as tear-propagation force and stated in [N].

Determination of Puncture Resistance in Accordance with ASTM E154-10

Puncture resistance is determined in accordance with ASTM E154-10 and stated in [N].

Determination of Tensile Strength in Aaccordance with ASTM D1970

Tensile strength is determined in accordance with ASTM D1970 and stated in [N].

The following illustrative examples of the invention and comparative examples serve to illustrate the invention, but are not to be interpreted as restrictive.

I. Chemical characterization of the raw materials used:
propylene copolymer: propylene-ethylene copolymer (ethylene content: from 7-9%) from Dow Chemicals
propylene homopolymer: propylene homopolymer from Borealis
masterbatch 1: color masterbatch from Schulman comprising about 50% by weight of polyethylene as polymer component
MSA-modified polypropylene: polypropylene from Mitsui, modified with maleic anhydride groups
IPDI copolyamide: copolyamide built from s-caprolactam, isophorone-diamine, and isoterephthalic acid, having about 5% isophoronediamine content, from Lanxess
copolyamide: copolyamide built from ε-caprolactam, hex-amethyl-enediamine, and adipic acid, from BASF
PA 6: homopolyamide built from ε-caprolactam, from Lanxess II. Production of the Multilayer Films The multilayer films of comparative examples CE1a and CE1b, and also of inventive example 1 (IE1), are each composed of five layers and have a total layer thickness of respectively 125 µm. The layer thickness of the layers (a) and (c) is respectively 42 µm, the layer thicknesses of the adhesion-promoter layers (d) and (e) are respectively 8 µm, and the layer thickness of the layer (b) is respectively 25 µm. The individual layers of the multilayer films are directly adjacent to one another in each case in the sequence in which they have been listed below. The individual layers (a), (b), (c), (d), and (e) in the multilayer films of comparative examples CE1a and CE1b, and also of inventive example 1 (IE1), were in each case produced by blown-film coextrusion.

III. Inventive Example and Comparative Examples

All of the following % data are % by weight.

EXAMPLE 1

Multilayer films IE1, CE1a, and CE1b

TABLE 1

| Layer structure for IE1, CE1a, CE1b | Raw materials for IE1 | Raw materials for CE1a | Raw materials for CE1b |
| --- | --- | --- | --- |
| Layer (a) | propylene copolymer (40%), masterbatch 1 (40%), propylene homopolymer (20%) | propylene copolymer (60%), masterbatch 1 (40%), (comprising no propylene homopolymer) | propylene copolymer (40%), masterbatch 1 (40%), propylene homopolymer (20%) |
| Adhesion-promoter layer (d) | MA-modified polypropylene (75%), propylene homopolymer (25%) | MA-modified polypropylene (75%), propylene homopolymer (25%) | MA-modified polypropylene (75%), propylene homopolymer (25%) |
| Layer (b) | IPDI copolyamide (50%), copolyamide (50%) | IPDI copolyamide (50%), copolyamide (50%) | PA 6 (100%) (comprising no isophorone-diamine) |
| Adhesion-promoter layer (e) | MA-modified polypropylene (75%), propylene homopolymer (25%) | MA-modified polypropylene (75%), propylene homopolymer (25%) | MA-modified polypropylene (75%), propylene homopolymer (25%) |
| Layer (c) | propylene copolymer (40%), masterbatch 1 (40%), propylene homopolymer (20%) | propylene copolymer (40%), masterbatch 1 (40%), (comprising no propylene homopolymer) | propylene copolymer (40%), masterbatch 1 (40%), propylene homopolymer (20%) |

For the multilayer films of inventive example 1 (IE1), and also comparative example 1 a (CE1a), the method described above was used in each case to determine puncture resistance and tensile strength.

For the multilayer films of inventive example 1 (IE1), and also comparative example 1 b (CE1b), the method described above was moreover used in each case to determine tear-propagation resistance.

TABLE 2

| Inventive example/comparative example | Puncture resistance [N] | Tensile strength [N] | Tear-propagation resistance |
| --- | --- | --- | --- |
| CE1a | about 230 | about 130 | — |
| CE1b | — | — | about 1000 |
| IE1 | about 280 | about 160 | about 2000 |

The multilayer film of inventive example IE1 of the invention also has a very good barrier effect against oil, determined by the method described above.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

The invention claimed is:

1. A sealing sheet comprising:
    a multilayer film consisting of
    (a) a layer composed of
        at least 30% by weight, based on the total weight of the layer (a), of at least one propylene copolymer,
        at least 20% by weight, based on the total weight of the layer (a), of at least one propylene homopolymer, optionally a further polyolefin, and
        optionally up to 30% by weight of additives, based on the total weight of the layer (a),
        whereby the components of layer (a) always give a total of 100% by weight,
    (b) at least one internal oil barrier layer based on at least one homo- and/or co-polyamide having isophoronediamine units as polyamide components and on at least one homo- and/or co-polyamide having no isophorone-diamine units as polyamide components,
    (c) a layer composed of
        at least 30% by weight, based on the total weight of the layer (c), of at least one propylene copolymer,
        at least 20% by weight, based on the total weight of the layer (c), of at least one propylene homopolymer, optionally a further polyolefin and
        optionally up to 30% by weight of additives, based on the total weight of the layer (c),
        whereby the components of layer (c) always give a total of 100% by weight;

(d) a first adhesion-promoter layer based on at least one modified thermoplastic olefin homo- or co-polymer and arranged between the layer (a) and the layer (b), and (e) a second adhesion promoter layer based on at least one modified thermoplastic olefin homo- or co-polymer and arranged between the layer (b) and the layer (c), wherein said multilayer film has a puncture resistance in accordance with ASTM E154-10 of at least 250 N, a tensile strength in accordance with ASTM D1970 of at least 150 N, and an Elmendorf tear-propagation resistance in accordance with ISO 6383-2 of at least 1500 mN;

and a sealing composition layer (h) based on a self-adhesive bitumen-based sealing composition or a self-adhesive rubber-based sealing composition arranged on the layer (a) or the layer (c).

2. The sealing sheet as claimed in claim 1, wherein the layer (b) of the multilayer film comprises at least 30% by weight, based on the total weight of the layer (b), of at least one copolyamide comprising isophoronediamine units.

3. The sealing sheet as claimed in claim 1, wherein the proportion of isophoronediamine units in the polyamide component of the layer (b) is at least 1% by weight, based on the total weight of said polyamide component.

4. The sealing sheet as claimed in claim 3, wherein the proportion of isophoronediamine units in the polyamide component of the multilayer film layer (b) is at least 3% by weight, based on the total weight of said polyamide component.

5. The sealing sheet as claimed in claim 1, wherein the polyamide component comprising isophoronediamine units of layer (b comprises aliphatic or aromatic dicarboxylic acid units.

6. The sealing sheet as claimed in claim 5, wherein the polyamide component comprising isophoronediamine units of layer (b) comprises aromatic dicarboxylic acid units.

7. The sealing sheet as claimed in claim 1, wherein the layer (a) of the multilayer film or the layer (c) of the multilayer film, or both, may each independently comprise at least 35% by weight, based in each case on the total weight of the respective layer, of at least one propylene co-polymer.

8. The sealing sheet as claimed in claim 1, wherein the layers (a) and (c) of the multilayer film have identical polymer components and identical layer structures.

9. The sealing sheet as claimed in claim 8, wherein the layers (a) and (c) of the multilayer film have identical layer thicknesses.

10. The sealing sheet as claimed in claim 1, wherein the multilayer film has a symmetrical construction relative to a central layer (b).

11. A method of sealing a building or part of a building against water or protecting a building or part of a building against weathering influences, said method comprising covering said building or part of a building with a sealing sheet as claimed in claim 1.

12. The sealing sheet as claimed in claim 1, further comprising a removable protective layer (g) as protective covering for the sealing composition layer (h).

* * * * *